(12) United States Patent
Cheon et al.

(10) Patent No.: US 11,799,628 B2
(45) Date of Patent: Oct. 24, 2023

(54) APPARATUS AND METHOD FOR PROCESSING NON-POLYNOMIAL OPERATION ON ENCRYPTED MESSAGES

(71) Applicant: Crypto Lab Inc., Seoul (KR)

(72) Inventors: Jung Hee Cheon, Seoul (KR); Dongwoo Kim, Seoul (KR); Du Hyeong Kim, Seoul (KR)

(73) Assignee: Crypto Lab Inc., Seoul (KR)

( * ) Notice: Subject to any disclaimer, the term of this patent is extended or adjusted under 35 U.S.C. 154(b) by 215 days.

(21) Appl. No.: 17/311,567

(22) PCT Filed: Nov. 13, 2019

(86) PCT No.: PCT/KR2019/015410
§ 371 (c)(1),
(2) Date: Jun. 7, 2021

(87) PCT Pub. No.: WO2020/116807
PCT Pub. Date: Jun. 11, 2020

(65) Prior Publication Data
US 2022/0029782 A1 Jan. 27, 2022

Related U.S. Application Data

(60) Provisional application No. 62/776,883, filed on Dec. 7, 2018.

(30) Foreign Application Priority Data

Oct. 16, 2019 (KR) .......................... 10-2019-0128403

(51) Int. Cl.
*H04L 9/00* (2022.01)
*H04L 9/30* (2006.01)

(52) U.S. Cl.
CPC .............. *H04L 9/008* (2013.01); *H04L 9/304* (2013.01); *H04L 9/3006* (2013.01)

(58) Field of Classification Search
CPC ....... H04L 9/008; H04L 9/3006; H04L 9/304; H04L 9/3093
See application file for complete search history.

(56) References Cited

U.S. PATENT DOCUMENTS 9,281,941 B2   3/2016   Gentry et al.
9,819,650 B2   11/2017  Soon-Shiong et al.
(Continued)

FOREIGN PATENT DOCUMENTS

JP   S59-173817 A      10/1984
JP   2018-124513 A     8/2018
KR   10-2018-0127506 A 11/2018

OTHER PUBLICATIONS

On theory and applications of mathematics to security in cloud computing: a case of addition-composition fully homomorphic encryption scheme, by Okelo et al. (published 2016). (Year: 2016).*

(Continued)

*Primary Examiner* — Vu V Tran
(74) *Attorney, Agent, or Firm* — Osha Bergman Watanabe & Burton LLP

(57) ABSTRACT

Disclosed is a ciphertext calculation method. The ciphertext calculation method comprises the steps of: receiving a comparative calculation command for a plurality of ciphertexts of the same type; performing a calculation by reflecting the plurality of ciphertexts of the same type on a synthesis function corresponding to the comparative calculation command; and outputting the calculated ciphertexts of the same type.

11 Claims, 13 Drawing Sheets

(56) References Cited

U.S. PATENT DOCUMENTS

| | | |
|---|---|---|
| 2013/0170640 A1 | 7/2013 | Gentry |
| 2017/0004324 A1 | 1/2017 | Seo et al. |
| 2017/0180115 A1 | 6/2017 | Laine et al. |
| 2017/0293913 A1 | 10/2017 | Gulak et al. |
| 2019/0007197 A1* | 1/2019 | Laine .................... H04L 9/3093 |
| 2020/0136798 A1* | 4/2020 | Kim ........................ H04L 9/008 |
| 2020/0235908 A1* | 7/2020 | Hiromasa .............. G06N 3/048 |

OTHER PUBLICATIONS

Known Plaintexts Attack on Polynomial based Homomorphic Encryption, by Babenko et al., published 2014 (Year: 2014).*

Cetin, G.S. et al., "Arithmetic Using Word-wise Homomorphic Encryption", Cryptology ePrint Archive, Paper 2015/1195 Ver. 20160318:204013, [online], Mar. 2016, pp. 1-15, (15 pages).

Crawford, J.L.H. et al. "Doing Real Work with FHE: The Case of Logistic Regression", Cryptology ePrint Archive, Paper 2018/202, [online], Feb. 19, 2018, (29 pages).

Ivan Damgard et al., "Homomorphic encryption and secure comparison", International Journal of Applied Crypotograpgy vol. 1, No. 1 , Jan. 1, 2008 (Jan. 1, 2008), pp. 22-31, XP 055678742, (11 pages).

Chao-Yung Hsu et al., "Image Feature Extraction in Encrypted Domain With Privacy-Preserving SIFT", IEEE Transactions on Image Processing, vol. 21, No. 11, Nov. 2012 (Nov. 1, 2012) pp. 4593-4607, XP 011492190, (15 pages).

Office Action in corresponding Japanese Patent Application No. 2021-532251 dated Jun. 14, 2022, with translation (10 pages).

Extended European Search Report issued in corresponding European Patent Application No. 19892114.0 dated Jul. 27, 2022 (6 pages).

International Search Report issued in International Application No. PCT/KR2019/015410, dated Mar. 6, 2020 (5 pages).

Written Opinion issued in International Application No. PCT/KR2019/015410, dated Mar. 6, 2020 (4 pages).

Office Action issued in corresponding Korean Patent Application No. 10-2019-0128403, dated Feb. 18, 2021 (9 pages).

Written Opinion issued in corresponding Singapore Patent Application No. 11202105753T dated Dec. 6, 2022 (8 pages).

* cited by examiner

FIG. 5

| Algorithm 1 Inv(x;d) |
|---|
| Input: $0 < x < 2, d \in \mathbb{N}$ |
| Output: an approximate value of $1/x$ (refer Lemma 1) |
| 1: $a_0 \leftarrow 2 - x$ |
| 2: $b_0 \leftarrow 1 - x$ |
| 3: for $n \leftarrow 0$ to $d - 1$ do |
| 4:     $b_{n+1} \leftarrow b_n^2$ |
| 5:     $a_{n+1} \leftarrow a_n \cdot (1 + b_{n+1})$ |
| 6:    end for |
| 7:    return $a_d$ |

FIG. 6

| Algorithm 2 Sqrt(x;d) |
|---|
| Input: $0 \leq x \leq 1$, d $\in \mathbb{N}$ |
| Output: an approximate value of $\sqrt{x}$ (refer Lemma 2) |
| 1: $a_0 \leftarrow x$ |
| 2: $b_0 \leftarrow x - 1$ |
| 3: for $n \leftarrow 0$ to $d - 1$ do |
| 4: $\quad a_{n+1} \leftarrow a_n \left(1 - \frac{b_n}{2}\right)$ |
| 5: $\quad b_{n+1} \leftarrow b_n^2 \left(\frac{b_n - 3}{4}\right)$ |
| 6: end for |
| 7: return $a_d$ |

FIG. 7

| Algorithm 3 Min(a, b; d), Max(a, b; d) |
| --- |
| Input: a, b ∈ [0,1), d ∈ ℕ |
| Output: an approximate value of min(a, b) and max(a,b) (refer Theorem 1,2) |
| 1: $x = \dfrac{a+b}{2}$ and $y = \dfrac{a-b}{2}$ |
| 2: $z \leftarrow \text{Sqrt}(y^2; d)$ |
| 3: return  $x - z$ for Min(a, b; d) <br>            $x + z$ for Max(a, b; d) |

FIG. 8

| Algorithm 4 Comp(a, b; d, d', t, m) |
|---|
| Input: distinct numbers a, b $\in [\frac{1}{2}, \frac{3}{2})$, d, d', t, m $\in \mathbb{N}$ |
| Output: an approximate value of comp(a, b) (refer Theorem 4) |
| 1: $a_0 \leftarrow \frac{a}{2} \cdot \text{Inv}\left(\frac{a+b}{2}; d'\right)$ |
| 2: $b_0 \leftarrow 1 - a_0$ |
| 3: for n $\leftarrow$ 0 to t $-$ 1 do |
| 4:    inv $\leftarrow$ Inv($a_n^m + b_n^m$; d) |
| 5:    $a_{n+1} \leftarrow a_n^m \cdot \text{inv}$ |
| 6:    $b_{n+1} \leftarrow 1 - a_{n+1}$ |
| 7: end for |
| 8: return $a_t$ |

FIG. 9

| Algorithm 5 NewComp(a, b; n, d) |
|---|
| Input: a, b ∈ [0, 1], n, d ∈ ℕ |
| Output: An approximate value of 1 if a > b, 0 if a < b and 1/2 otherwise |
| 1: $x \leftarrow a - b$ |
| 2: for $i \leftarrow 1$ to d do |
| 3:   $x \leftarrow f_n(x)$                                                    // compute $f_n^{(d)}(a - b)$ for input a and b |
| 4: end for |
| 5: return $(x+1)/2$ |

Algorithm 6 FindG(n, c)

---

Input: $n \in \mathbb{N}, 0 < c < 1$

Output: A degree-$(2n+1)$ polynomial $g_{n,c}$ satisfying Prop I & IV with minimal $\delta$ of Prop IV.

1: $g_{n,c} \leftarrow x$
2: repeat
3:    $\delta_0 \leftarrow$ minimal $\delta$ such that $g_{n,c}([\delta,1]) \subseteq [1-c,1]$
4:    $g_{min} \leftarrow$ degree-$(2n+1)$ minimax approx. poly. of $(1-\frac{c}{2}) \cdot \text{sgn}(x)$ over $[-1, -\delta_0] \cup [\delta_0, 1]$
5:    $g_{n,c} \leftarrow g_{min}$
6:    $S \leftarrow \|g_{n,c} - (1-\frac{c}{2})\|_{\infty,[\delta_0,1]}$
7: unit $S == \frac{c}{2}$
8: return $g_{n,c}$

| Algorithm 7 NewCompG(a, b; n, d_f, d_g) |
|---|
| Input: a, b ∈ [0,1], n, d_f, d_g ∈ $\mathbb{N}$ |
| Output: An approximate value of 1 if a > b, 0 if a < b and 1/2 otherwise |
| 1: x ← a − b |
| 2: for i ← 1 to $d_g$ do |
| 3:    x ← $g_n(x)$        // compute $g_n^{(d_g)}(a-b)$ for input a and b |
| 4: end for |
| 5: for i ← 1 to $d_f$ do |
| 6:    x ← $f_n(x)$        // compute $f_n^{(d_f)}(a-b)$ for input a and b |
| 7: end for |
| 8: return (x+1)/2 |

APPARATUS AND METHOD FOR PROCESSING NON-POLYNOMIAL OPERATION ON ENCRYPTED MESSAGES

TECHNICAL FIELD

The disclosure relates to an apparatus and a method for performing non-polynomial computation such as comparison computation on an approximate encrypted messages.

BACKGROUND ART

Along with development of communication technologies and active distribution of electronic apparatuses, there are continuous efforts for maintaining communication security between electronic apparatuses. Accordingly, in most communication environments, encryption/decryption technologies are used.

When a message encrypted by the encryption technology is delivered to the other party, the other party needs to perform the decryption to use the message. In this case, the other party may waste resources and time during a process of decrypting the encrypted data. In addition, when a third party performs hacking in a state where the other party has decrypted the message temporarily for computation, the message may easily leak to the third party.

In order to solve such problems, researches on a homomorphic encryption method are conducted. According to the homomorphic encryption, although the computation is performed on an encrypted message itself without decrypting encrypted information, a result that is the same as a value obtained by computing and then encrypting a plaintext may be obtained. Accordingly, various computation may be performed in a state where the encrypted message is not decrypted.

However, the homomorphic ciphertext of the related art supports only some of computation such as addition, multiplication, and the like, and accordingly, it is required to obtain a method for applying non-polynomial computation such as comparison computation on the homomorphic ciphertext.

DISCLOSURE

Technical Problem

The disclosure is made to solve the aforementioned problems, and an object thereof is to provide an apparatus and a method for performing non-polynomial computation such as comparison computation on an approximate encrypted message.

Technical Solution

The disclosure is to achieve the above object. According to an aspect of the disclosure, there is provided a ciphertext computation method includes receiving an input of a comparison computation command for a plurality of homomorphic ciphertexts, performing computation by reflecting the plurality of homomorphic ciphertexts to a composite function corresponding to the comparison computation command, and outputting the computed homomorphic ciphertext.

The composite function may have a complexity $\theta(\alpha)$ or $\theta(\alpha \log \alpha)$ in response to an accuracy $2^{-\alpha}$.

The comparison computation may be maximum value calculation or minimum value calculation, and the performing the computation may include performing computation of the maximum value calculation or the minimum value calculation by using a composite function corresponding to square root computation.

The composite function corresponding to the square root computation may be a function that repeatedly performs computation of a first function including a first variable having an input value as an initial value and a second variable having a value obtained by subtracting 1 from the input value as an initial value, and a second function including the second variable predetermined number of times.

The predetermined number of times may be a number of times corresponding to an error rate of the square root computation.

The comparison computation may be computation of outputting a predetermined value according to size comparison, and the performing the computation may include repeatedly performing computation of a composite function including function computation corresponding to inverse computation predetermined number of times.

The comparison computation may be computation of outputting a predetermined value according to size comparison, and the performing the computation may include repeatedly performing computation by using a composite function corresponding to a sign function predetermined number of times.

The composite function corresponding to the sign function may be a composite function that obtains an output value closer to 1 for an input value larger than 0 and obtains an output value closer to −1 for an input value smaller than 0.

The performing the computation may include performing the comparison computation by using two or more different composite functions which are approximate functions corresponding to the sign function.

According to another aspect of the disclosure, there is provided a computation apparatus including a memory storing at least one instruction, and a processor configured to execute the at least one instruction, in which the processor, by executing the at least one instruction, is configured to, based on an input of a comparison computation command for a plurality of homomorphic ciphertexts being received, perform computation by reflecting the plurality of homomorphic ciphertexts to a composite function corresponding to the comparison computation command, and output the computed homomorphic ciphertext.

The comparison computation may be maximum value calculation or minimum value calculation, and the processor may be configured to perform computation of the maximum value calculation or the minimum value calculation by using a composite function corresponding to square root computation.

The comparison computation may be computation of outputting a predetermined value according to size comparison, and the processor may be configured to repeatedly perform computation of a composite function including function computation corresponding to inverse computation predetermined number of times.

The comparison computation may be computation of outputting a predetermined value according to size comparison, and the processor may be configured to repeatedly perform computation by using a composite function corresponding to a sign function predetermined number of times.

The composite function corresponding to the sign function may be a composite function that obtains an output value closer to 1 for an input value larger than 0 and obtains an output value closer to −1 for an input value smaller than 0.

The processor may be configured to perform the comparison computation by using two or more different composite functions which are approximate functions corresponding to the sign function.

Effect of Invention

According to various embodiments of the disclosure described above, in the homomorphic ciphertext processing method, the comparison computation on the approximate encrypted ciphertext may be performed by using the composite function. In addition, the composite function suggested in the disclosure has low complexity, and therefore faster computation may be performed, even if accuracy increases.

DESCRIPTION OF DRAWINGS

FIG. 5 is a diagram illustrating a method for calculating inverse computation by using a composite function according to an embodiment;

FIG. 6 is a diagram illustrating a method for calculating square root computation by using a composite function according to an embodiment;

FIG. 7 is a diagram illustrating a method for calculating a maximum value and a minimum value according to an embodiment;

FIG. 8 is a diagram illustrating a size comparison method according to a first embodiment;

FIG. 9 is a diagram illustrating a size comparison method according to a second embodiment;

FIG. 10 is a diagram illustrating a method for finding a composite function corresponding to a slope of a sign function;

FIG. 11 is a diagram illustrating a size comparison method according to a third embodiment;

BEST MODE

-

Detailed Description of Exemplary Embodiments

Hereinafter, the disclosure will be described in detail with reference to the accompanying drawings. For an information (data) transmission process performed in the disclosure, encryption/decryption may be applied, if necessary. In the disclosure and claims, the expression describing the information (data) transmission process should be construed as including both encryption and decryption, although it is not specified separately. In the disclosure, the expression such as "transmit (transfer) from A to B" or "receive by A from B" includes the transmission (transfer) or reception with another medium interposed therebetween, and does not express only direct transmission (transfer) from A to B or direct reception by A from B.

In describing the disclosure, it should be understood that the order of each step is not limited, unless the previous step needs to be performed before the following step logically and temporally. In other words, except for the above exceptions, the gist of the disclosure is not affected even if the process described as the following step is performed before the process described as the previous step, and a scope of a right also should be defined regardless of the order of steps. In the specification, "A or B" does not only selectively indicate any one of A and B, but is defined to include both A and B. In addition, a term "comprise" in the disclosure encompasses further including other elements, in addition to the listed elements.

In the specification, only essential elements necessary for the describing the disclosure are described and elements with no relation to the gist of the disclosure are not mentioned. The disclosure should not be construed in an exclusive sense that includes only the recited elements, but should be interpreted in a non-exclusive sense to include other elements as well.

A "value" in the disclosure is defined to include not only a scalar value but also a vector.

The mathematical operation and calculation of each step of the disclosure which will be described below may be implemented as computer computation by a coding method well known for the corresponding operation or calculation and/or coding designed to be suitable to the disclosure.

The specific formulas described below are exemplary examples among several possible alternatives, and it should not be interpreted that the scope of a right of the disclosure is limited to the formulas in the disclosure.

For convenience of the description, the following notations will be used in the disclosure.

a←D: an element (a) is selected according to distribution (D)

$s_1, s_2 \in R$: each of S1 and S2 is an element belonging to a set R.

mod(q): Modular computation is performed with an element q $\lceil \cdot \rfloor$: rounding off internal value Hereinafter, various embodiments of the disclosure will be described in detail with reference to the accompanying drawings.

Figure 1:
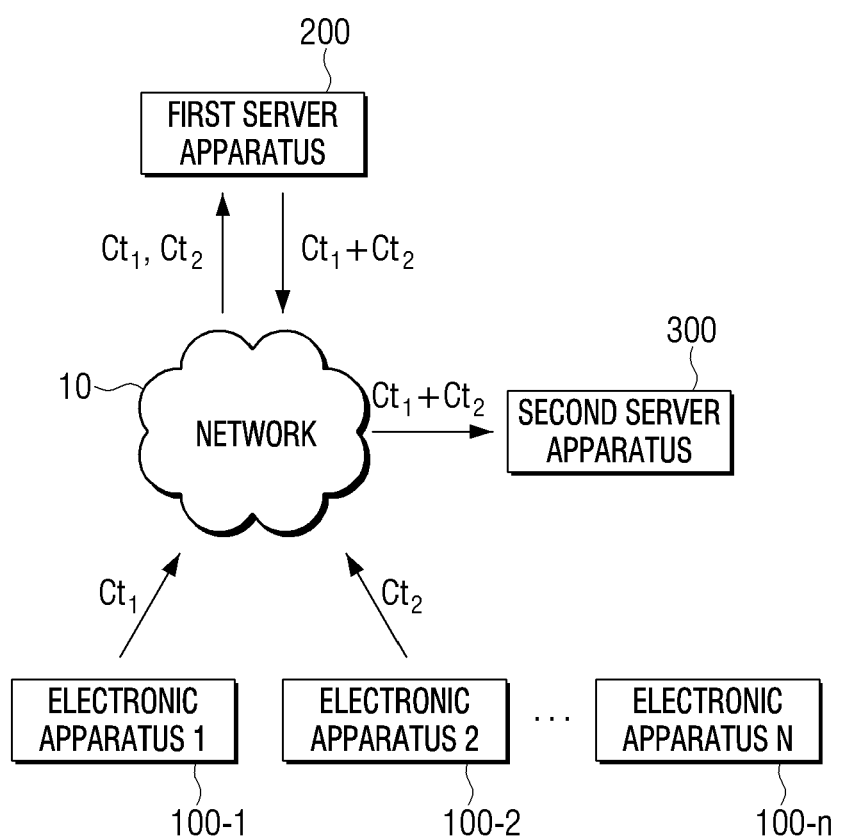
FIG. 1 is a diagram illustrating a structure of a network system according to an embodiment.

FIG. 1 is a diagram illustrating a configuration of a network system according to an embodiment.

Referring to FIG. 1, a network system includes a plurality of electronic apparatuses 100-1, . . . , and 100-n, a first server apparatus 200, and a second server apparatus 300, and the elements may be connected to each other via a network 10.

The network 10 may be implemented as various types of wired and wireless communication networks, a broadcasting communication network, an optical communication network, a cloud network, and the like and each of the apparatuses may be connected by a method such as Wi-Fi, Bluetooth, near field communication (NFC), or the like without a separate medium.

Referring to FIG. 1, it is illustrated that the electronic apparatus is provided in plurality (100-1, . . . , and 100-n), but it is not necessary to use the plurality of electronic apparatuses and one apparatus may be used. For example, the electronic apparatuses 100-1, . . . , and 100-n may be implemented as various types of apparatuses such as a smartphone, a tablet, a game player, a PC, a laptop PC, a home server, a kiosk, and the like and may also be implemented in a form of a home appliance applied with an IoT function.

A user may input various pieces of information through the electronic apparatuses 100-1, . . . , and 100-n that the user uses. The input information may be stored in the electronic apparatuses 100-1, . . . , and 100-n themselves and may also be transmitted to and stored in an external apparatus due to reasons of a storage capacity, security, and the like. Referring to FIG. 1, the first server apparatus 200 may play a role of storing such information and the second server apparatus 300 may play a role of using some or all of the information stored in the first server apparatus 200.

Each of the electronic apparatuses 100-1, . . . , and 100-n may perform homomorphic encryption on the input information and transmit a homomorphic ciphertext to the first server apparatus 200.

Each of the electronic apparatuses 100-1, . . . , and 100-n may include an encryption noise calculated during the process of performing the homomorphic encryption, that is, an error in the ciphertext. Specifically, the homomorphic ciphertext generated from each of the electronic apparatuses 100-1, . . . , and 100-n may be generated so that a result value including a message and an error value is restored when decryption is performed using a secret key later.

For example, the homomorphic ciphertext generated from each of the electronic apparatuses 100-1, . . . , and 100-n may be generated so as to satisfy the following property when decryption is performed using a secret key.

$$Dec(ct, sk) = \langle ct, sk \rangle = M + e \pmod{q} \quad \text{[Formula 1]}$$

Herein, $\langle,\rangle$ represents a usual inner product, ct represents a ciphertext, sk represents a secret key, M represents a plaintext message, e represents an encryption error value, and mod q represents a modulus of the ciphertext. For q, it is necessary to select a value that is larger than a result value M obtained by multiplying the message by a scaling factor $\Delta$. If an absolute value of the error value e is sufficiently smaller than M, a decryption value M+e of the ciphertext may be a value that may be replaced with an original message at the same degree of accuracy in significant figure computation. Among the decrypted data, an error may be disposed on a side of a least significant bit (LSB) and M may be disposed on a side of a second least significant bit.

If the size of the message is extremely small or large, the size thereof may be adjusted by using a scaling factor. When the scaling factor is used, not only a message in a form of integer, but also a message in a form of real number may be encrypted, and accordingly usability may significantly increase. In addition, by adjusting the size of the message using the scaling factor, a domain where messages are present, that is, a valid domain of the ciphertext after performing the computation may be adjusted in its size.

According to an embodiment, the ciphertext modulus q may be set and used in various forms. For example, the modulus of the ciphertext may be set in a form of $q=\Delta^L$ which is exponentiation of the scaling factor $\Delta$. When $\Delta$ is 2, a value such as $q=2^{10}$ may be set.

The first server apparatus 200 may store the received homomorphic ciphertext in a state of the ciphertext without performing decryption.

The second server apparatus 300 may request the first server apparatus 200 for a specific processing result of the homomorphic ciphertext. The first server apparatus 200 may perform specific computation according to the request of the second server apparatus 300 and transmit the result thereof to the second server apparatus 300.

In an example, when ciphertexts ct1 and ct2 transmitted by the two electronic apparatuses 100-1 and 100-2 are stored in the first server apparatus 200, the second server apparatus 300 may request the first server apparatus 200 for a value obtained by adding the pieces of information provided form the two electronic apparatuses 100-1 and 100-2. The first server apparatus 200 may perform the computation of adding the two ciphertexts and transmit the result value (ct1+ct2) to the second server apparatus 300 according to the request.

From the property of the homomorphic ciphertext, the first server apparatus 200 may perform the computation in a state where the decryption is not performed, and a result value thereof is in a form of the ciphertext. In the disclosure, the result value obtained by the computation may refer to a computation result ciphertext.

The first server apparatus 200 may transmit the computation result ciphertext to the second server apparatus 300. The second server apparatus 300 may decrypt the received computation result ciphertext and obtain a computation result value of pieces of data included in each of the homomorphic ciphertexts.

The first server apparatus 200 may perform the computation several times according to a user request. At that time, the first server apparatus 200 may perform not only the computation consisting of only addition, subtraction, and multiplication, but also the computation including inverse computation and square root computation. In addition, the first server apparatus 200 may perform comparison computation such as maximum value calculation, minimum value calculation, and size comparison. As described above, the first server apparatus 200 may be referred to as a computation apparatus, since it may perform the computation operation.

When performing the comparison computation, the first server apparatus 200 may perform the computation by using a composite function corresponding to non-polynomial computation. The composite function according to the disclosure has complexity $\theta(\alpha)$ or $\theta(\alpha \log \alpha)$ in response to accuracy $2^{-\alpha}$, and accordingly, faster computation than in the related art may be performed, in a case where the accuracy increases.

Meanwhile, referring to FIG. 1, it is illustrated that the first electronic apparatus and the second electronic apparatus perform the encryption and the second server apparatus performs the decryption, but there is no limitation thereto.

Figure 2:
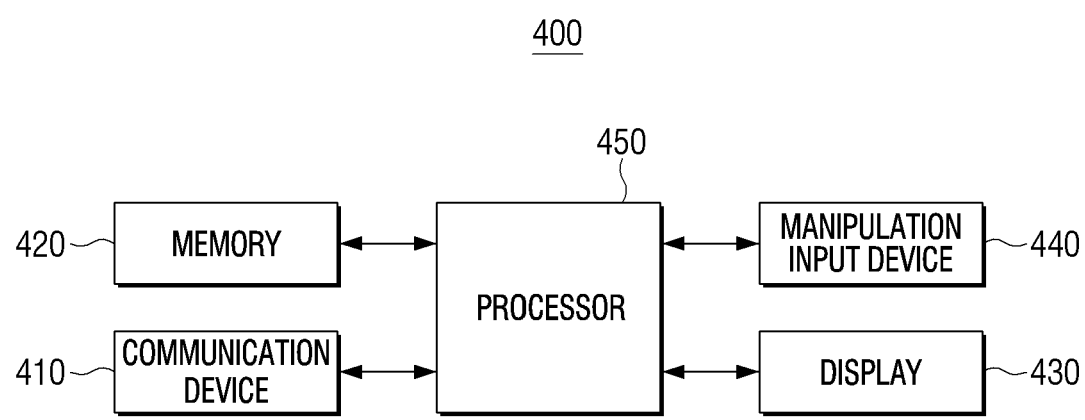
FIG. 2 is a block diagram illustrating a configuration of a computation apparatus according to an embodiment.

FIG. 2 is a block diagram illustrating a configuration of the computation apparatus according to an embodiment.

Specifically, in the system of FIG. 1, an apparatus which performs the homomorphic encryption such as the first electronic apparatus and the second electronic apparatus, an apparatus which performs the computation on the homomorphic ciphertext such as the first server apparatus, and an apparatus which decrypts the homomorphic ciphertext such as the second server apparatus may be referred to as computation apparatuses. Such computation apparatuses may be various apparatuses such as a personal computer (PC), a laptop, a smartphone, a tablet, a server, and the like.

Referring to FIG. 2, a computation apparatus 400 may include a communication device 410, a memory 420, a display 430, a manipulation input device 440, and a processor 450.

The communication device 410 may be formed to connect the computation apparatus 400 to an external apparatus (not illustrated), and may access the external apparatus through a local area network (LAN) and the Internet and may also access the external apparatus through a universal serial bus (USB) port or a wireless communication (e.g., Wi-Fi 802.11a/b/g/n, NFC, Bluetooth) port. The communication device 410 may be referred to as a transceiver.

The communication device 410 may receive a public key from the external apparatus and transmit a public key autonomously generated by the computation apparatus 400 to the external apparatus.

The communication device 410 may receive a message from the external apparatus and transmit the generated homomorphic ciphertext to the external apparatus.

In addition, the communication apparatus 410 may receive various parameters necessary to generate the ciphertext from the external apparatus. Meanwhile, in the implementation, various parameters may receive directly from the user through the manipulation input device 440 which will be described below.

In addition, the communication device 410 may receive a request for the computation on the homomorphic ciphertext from the external apparatus and transmit a result calculated accordingly to the external apparatus. The requested computation may be computation such as addition, subtraction, or multiplication or may also be a comparison computation which is the non-polynomial computation.

The memory 420 may store at least one instruction related to the computation apparatus 400. Specifically, the memory 420 may store various programs (or software) for operating the computation apparatus 400 according to various embodiments of the disclosure.

The memory 420 may be implemented as various types such as a RAM, a ROM, a flash memory, an HDD, an external memory, and a memory card, and is not limited to any one thereof.

The memory 420 may store a message to be encrypted. Herein, the message may be various pieces of credit information, private information, and the like referred by the user, and may be information related to usage history or the like such as location information, Internet usage time information, and the like used on the computation apparatus 400.

The memory 420 may store a private key, and if the computation apparatus 400 is an apparatus which directly generates a public key, the memory 420 may store not only the secret key, but also various parameters necessary to generate a private key and a secret key.

The memory 420 may store the homomorphic ciphertext generated in the process which will be described below. The memory 420 may store the homomorphic ciphertext transmitted from the external apparatus. In addition, the memory 420 may also store a computation result ciphertext which is a result from the computation process which will be described below.

The display 430 may display a user interface window for receiving selection of a function supported by the computation apparatus 400. Specifically, the display 430 may display a user interface window for receiving selection of various functions provided by the computation apparatus 400. The display 430 may be a monitor such as a liquid crystal display (LCD), an organic light emitting diode (OLED), or the like, and may also be implemented as a touch screen capable of simultaneously performing the function of the manipulation input device 440 which will be described below.

The display 430 may display a message for requesting an input of a parameter necessary to generate a secret key and a public key. The display 430 may display a message for selecting an encryption target. Meanwhile, in the implementation, the encryption target may be directly selected by the user or selected automatically. In other words, the private information and the like necessary to be encrypted may be automatically set, although the user does not select the message directly.

The manipulation input device 440 may receive selection of a function of the computation apparatus 400 and a control command for the corresponding function from the user. Specifically, the manipulation input device 440 may receive an input of a parameter necessary to generate the secret key and the public key from the user. In addition, the manipulation input device 440 may set the message to be encrypted from the user.

The processor 450 may control general operations of the computation apparatus 400. Specifically, the processor 450 may generally control the operations of the computation apparatus 400 by executing at least one instruction stored in the memory 420. The processor 450 may be configured with a single device such as a central processing unit (CPU) or an application-specific integrated circuit (ASIC), or may also be configured with a plurality of devices such as a CPU, a graphics processing unit (GPU), and the like.

When a message to be transmitted is input, the processor 450 may store the message in the memory 420. The processor 450 may perform the homomorphic encryption on the message by using various setting values and programs stored in the memory 420. In this case, the public key may be used.

The processor 450 may autonomously generate and use the public key necessary to perform the encryption or may receive the public key from the external apparatus and use the public key. In an example, the second server apparatus 300 which performs the decryption may distribute the public key to other apparatuses.

In a case of generating the key autonomously, the processor 450 may generate the public key by using a Ring-LWE technique. Specifically, first, the processor 450 may set various parameters and rings and store in the memory 420. Examples of the parameter may include a length of bits of a plaintext message, a size of the public key and the secret key, and the like.

The ring may be represented by the formula as below.

$$R = \mathbb{Z}_q[x]/(f(x)) \qquad \text{[Formula 2]}$$

Herein, R represents a ring, Zq represents a coefficient, and f(x) represents an n-th degree polynomial.

The ring is a set of polynomials having a predetermined coefficient and refer to a set in which addition and multiplication between elements are defined and the set being closed for the addition and multiplication. Such a ring may be referred to as an annulus.

For example, the ring may refer to a set of n-th degree polynomial in which a coefficient is Zq. Specifically, when n is Φ(N), the ring may refer to an n-th cyclotomic polynomial. f(x) represents an ideal of Zq[x] generated as f(x). An Euler totient function Φ(N) refers to the number of natural numbers that are relatively prime with N and smaller than N. When $\Phi_N(x)$ is defined as the n-th cyclotomic polynomial, the ring may be represented by Formula 3 as below.

$$R = \mathbb{Z}_q[x]/(\phi_N(x)) \qquad \text{[Formula 3]}$$

The secret key (sk) may be represented as below.

Meanwhile, the ring of Formula 3 described above has a complex number in a plaintext space. In order to improve a computation speed for the homomorphic ciphertext, only a set with real number in the plaintext space among the set of the ring described above may be used.

When such a ring is set, the processor 450 may calculate the secret key (sk) from the ring.

$$sk \leftarrow (1, s(x)), s(x) \in R \quad \text{[Formula 4]}$$

Herein, s(x) represents a polynomial generated randomly with a small coefficient.

The processor 450 may calculate a first random polynomial a(x) from the ring. The first random polynomial may be represented as below.

$$a(x) \leftarrow R \quad \text{[Formula 5]}$$

The processor 450 may calculate an error. Specifically, the processor 450 may extract an error from a discrete Gaussian distribution or a distribution having a statistic distance closer thereto. Such an error may be represented as below.

$$e(x) \leftarrow D_{\alpha q}^n \quad \text{[Formula 6]}$$

When the error is calculated, the processor 450 may modulate the error into the first random polynomial and the secret key to calculate a second random polynomial. The second random polynomial may be represented as below.

$$b(x) = -a(x)s(x) + e(x) \pmod{q} \quad \text{[Formula 7]}$$

Finally, the public key (pk) may be set as below to include the first random polynomial and the second random polynomial.

$$pk = (b(x), a(x)) \quad \text{[Formula 8]}$$

The key generation method described above is merely an example, and thus is not limited thereto, and the public key and the secret key may also be generated by other methods.

Meanwhile, when the public key is generated, the processor 450 may control the communication device 410 to transmit the public key to other apparatuses.

The processor 450 may generate a homomorphic ciphertext for the message. Specifically, the processor 450 may generate a homomorphic ciphertext by applying a public key generated previously for the message. The processor 450 may generate the ciphertext so that a length of the ciphertext corresponds to a size of the scaling factor.

When the homomorphic ciphertext is generated, the processor 450 may store the homomorphic ciphertext in the memory 420 or control the communication device 410 to transmit the homomorphic ciphertext to another apparatus according to the user request or a predetermined default command.

According to an embodiment of the disclosure, packing may be performed. When the packing is used in the homomorphic encryption, it is possible to encrypt a plurality of messages into one ciphertext. In this case, when the computation between the ciphertexts is performed on the computation apparatus 400, the computation for the plurality of messages may be processed in parallel, thereby significantly reducing the computation load.

Specifically, when the message is formed of a plurality of message vectors, the processor 450 may convert the plurality of message vectors into a polynomial so as to be encrypted in parallel, multiply the polynomial by the scaling factor, and perform the homomorphic encryption by using the public key. Accordingly, the ciphertext with the plurality of packed message vectors may be generated.

When it is necessary to decrypt the homomorphic ciphertext, the processor 450 may generate a decrypted text in a polynomial form by applying the secret key to the homomorphic ciphertext, and decode the decrypted text in a polynomial form to generate a message. The message generated herein may include an error, as described with reference to Formula 1 described above.

The processor 450 may perform the computation on the ciphertext. Specifically, the processor 450 may perform the computation such as addition, subtraction, or multiplication while maintaining the encrypted state of the homomorphic ciphertext.

In addition, the processor 450 may perform the computation for the polynomial with the computation other than the addition, subtraction, or multiplication on the ciphertext. Specifically, the homomorphic ciphertext is closed for the addition, subtraction, or multiplication but is not closed for the other computation.

Accordingly, for the computation other than the addition, subtraction, or multiplication, it is necessary to use an approximate computation expression represented by the above three computation. In this regard, for the computation other than the addition, subtraction, or multiplication, the processor 450 may perform computation by using an approximate function corresponding to the requested computation.

For this, an approximate function (e.g., Taylor, Least square, or minimax) well known in the related art may be used, but the approximate function in the related art has complexity $\theta(2^{\alpha/2})$ with respect to an accuracy $2^{-\alpha}$. In other words, in the method of the related art, the computation becomes complicated exponentially with respect to the accuracy, and therefore, as the accuracy increases, longer computation time is needed.

In order to solve such a problem, in the disclosure, a composite function having complexity $\theta(\alpha)$ or $\theta(\alpha \log \alpha)$ in response to the accuracy $2^{-\alpha}$, that is, the approximate function may be used. Specifically, in the disclosure, rather than the general polynomial, well-structured polynomials with more efficient evaluation, that is, the composite function may be used.

In the disclosure, the composite function is suggested for each of the inverse computation, square root, the maximum value or minimum value, and the size comparison, and a method for applying the composite function to each computation will be described below with reference to FIGS. 5 to 10.

When the computation is completed, the computation apparatus 400 may detect data in a valid domain from the computation result data. Specifically, the computation apparatus 400 may detect the data in the valid domain by performing a rounding process of the computation result data. The rounding process may refer to rounding-off a message in an encrypted state and may also be referred to as rescaling.

In addition, when a percentage of the approximate message in the computation result ciphertext exceeds a threshold value, the computation apparatus 400 may perform a rebooting operation on the ciphertext.

Figure 3:
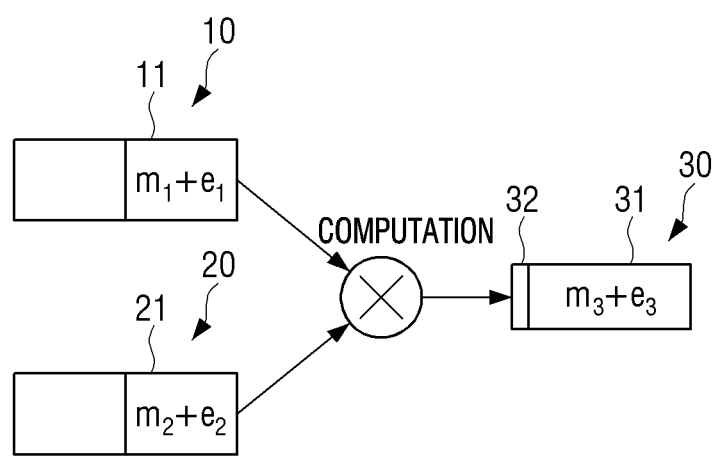
FIG. 3 is a diagram illustrating a computation operation of the computation apparatus according to an embodiment.

FIG. 3 is a diagram illustrating a computation operation of the computation apparatus according to an embodiment.

Referring to FIG. 3, homomorphic ciphertexts 10 and 20 include approximate message areas 11 and 21, respectively. The approximate message areas 11 and 21 have messages and errors m1+e1 and m2+e2, respectively.

The computation apparatus 400 may perform specific computation by using the two homomorphic ciphertexts 10 and 20 as input values. The computation may be a polynomial computation formed of addition, subtraction, or multiplication and may also be polynomial computation or non-polynomial computation in which it is necessary to use approximate function.

The most representative computation of the non-polynomial computation is the comparison computation and may be maximum value calculation, minimum value calculation, or size comparison. The maximum value calculation may be outputting a large value from two values, the minimum value calculation may be outputting a minimum value from two values, and the size comparison may be outputting 1, if any one value is large, outputting 0, if the other value is large, and outputting ½, if the two values are the same as each other. Meanwhile, in the size comparison, the output numerical value is merely an example, and in the implementation, other values may be output.

The maximum value calculation may be represented by Formula 9 as below and the minimum value calculation may be represented by Formula 10 as below.

$$\max(a, b) = \frac{a+b}{2} + \frac{\sqrt{(a-b)^2}}{2} \quad \text{[Formula 9]}$$

Herein, a represents a first homomorphic ciphertext, b represents a second homomorphic ciphertext, max(a, b) represents a function that outputs a value of the homomorphic ciphertext having a larger value among the first homomorphic ciphertext and the second homomorphic ciphertext.

$$\min(a, b) = \frac{a+b}{2} - \frac{\sqrt{(a-b)^2}}{2} \quad \text{[Formula 10]}$$

Herein, a represents a first homomorphic ciphertext, b represents a second homomorphic ciphertext, min(a, b) represents a function that outputs a value of the homomorphic ciphertext having a smaller value among the first homomorphic ciphertext and the second homomorphic ciphertext.

Referring to Formulas 9 and 10 described above, the computation such as addition, subtraction, and division by a constant 2 may be performed in the homomorphic ciphertext state, but the square root computation may not be performed in the homomorphic ciphertext state. Accordingly, an approximate polynomial is necessary for the square root computation, and a composite function that repeatedly performs computation of a first function for a first variable having an input value as an initial value and a second variable having a value obtained by subtracting 1 from the input value as an initial value, and a second function having the second variable predetermined number of times may be used. The specific operation of the square root computation will be described below with reference to FIG. 6.

When the composite function corresponding to the square root computation is used, the maximum value calculation and the minimum value calculation may be represented as below.

$$\max(a, b; d) = \frac{a+b}{2} + \frac{Sqrt((a-b)^2; d)}{2} \quad \text{[Formula 11]}$$

$$\min(a, b; d) = \frac{a+b}{2} - \frac{Sqrt((a-b)^2; d)}{2} \quad \text{[Formula 12]}$$

Herein, a represents a first homomorphic ciphertext, b represents a second homomorphic ciphertext, d represents a repeated number of times, and Sqrt((a−b)$^2$; d) represents a composite function corresponding to the square root computation.

The size comparison may be approximated by repeatedly performing the computation of the Formula such as $$\frac{a^k}{a^k + b^k},$$

and the Formula corresponding to the above size comparison may include inverse computation on the homomorphic ciphertext. The inverse computation may not be performed directly in the homomorphic ciphertext state, and therefore, in the disclosure a composite function corresponding to the inverse computation may be used. A specific operation of the inverse computation will be described below with reference to FIG. 5.

Meanwhile, the size comparison may be approximated by using a sign function, and such a sign function may be a composite function that obtains output values which are parallel to each other for input values other than 0 (e.g., composite function that obtains an output value closer to 1 for an input value larger than 0 and obtains an output value closer to −1 for an input value smaller than 0) and/or may be composite function that obtains output values which are parallel to each other for input values other than 0. The operation of using such a composite function will be described below with reference to FIGS. 9 and 10.

Meanwhile, a ciphertext 30 obtained by the computation described above may include an approximate message domain 31 having a computation result (m3+e3) between the approximate messages. If a plaintext space 32 is removed or smaller than a limit value, the computation apparatus 400 may perform a rebooting operation.

Figure 4:
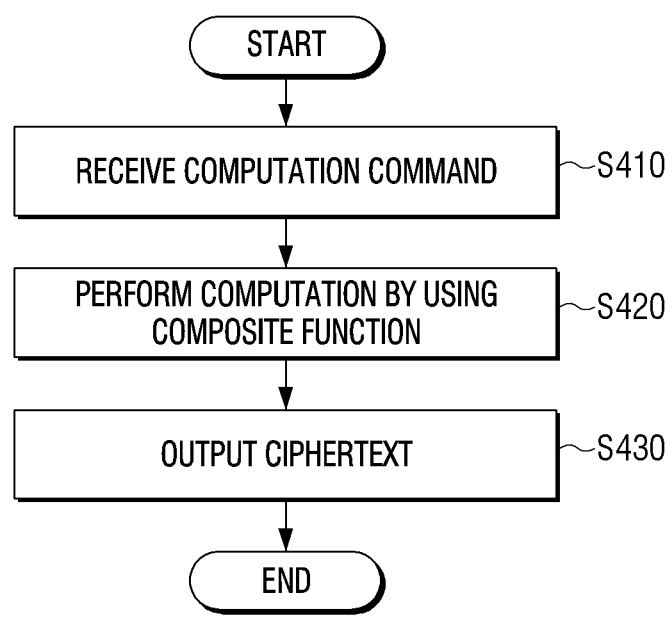
FIG. 4 is a flowchart illustrating a ciphertext computation method according to an embodiment.

FIG. 4 is a flowchart illustrating a ciphertext computation method according to an embodiment.

Referring to FIG. 4, a comparison computation command for a plurality of homomorphic ciphertexts may be received (S410). Such a command may be received from an external apparatus or may be input directly from the computation apparatus. The comparison computation may be one of minimum value calculation, maximum value calculation, and size comparison.

The computation may be performed by reflecting the plurality of homomorphic ciphertexts to the composite function corresponding to the comparison computation command (S420). Specifically, the comparison computation may be performed by using the composite function with the complexity θ(α) or θ(α log α).

The computed homomorphic ciphertext may be output (S430). Specifically, the computation result may be output to an apparatus which has requested the computation.

In the ciphertext computation method according to the disclosure, the computation may be proceeded with the complexity θ(α) or θ(α log α) in response to the accuracy 2$^{-α}$, and therefore, faster computation may be performed, even if it is necessary to obtain high accuracy.

FIG. 5 is a diagram illustrating a method for calculating inverse computation by using a composite function according to an embodiment.

Referring to FIG. 5, an inverse function Inv(x; d) for a variable x and a positive value d is a composite function in that a first variable $a_n$ having a value obtained by subtracting an input value x from 2 as an initial value $a_0$, and a second variable $b_n$ having a value obtained by subtracting the input value x from 1 as an initial value $b_0$ are set, and a first function $b^2_n$ having the second variable $b_n$ and a second function $a_n \cdot (1+B_{n+1})$ having the first variable $a_n$ and the second variable $b_n$ are repeated predetermined number of times.

The inverse function may be obtained by changing the Goldschmidt's division algorithm such as Formula 13 below.

$$\frac{1}{x} = \frac{1}{1-(1-x)} = \prod_{i=0}^{\infty}\left(1+(1-x)^{2^i}\right) \approx \prod_{i=0}^{d}\left(1-(1-x)^{2^i}\right) \quad \text{[Formula 13]}$$

The composite function for the inverse function may have complexity $\theta(\alpha)$.

FIG. 6 is a diagram illustrating a method for calculating square root computation by using a composite function according to an embodiment.

Referring to FIG. 6, square root computation Sqrt(x;d) for a variable x and a positive number d is a composite function in that a first variable $a_n$ having an input value x at an initial stage as an initial value $a_0$, and a second variable $b_n$ having a value obtained by subtracting 1 from the input value x as an initial value $b_0$ are set, and a first function $$a_n\left(1 - \frac{b_n}{2}\right)$$

having the first variable $a_n$ and the second variable $b_n$ and a second function $$b_n^2\left(\frac{b_n - 3}{4}\right)$$

having the second variable $b_n$ are repeated predetermined number of times.

The composite function for the square root may have the complexity $\theta(\alpha)$ with respect to an error bound $2^{-\alpha}$.

FIG. 7 is a diagram illustrating a method for calculating a maximum value and a minimum value according to an embodiment.

Referring to FIG. 7, the maximum value calculation and the minimum value calculation may be represented by Formulas 9 and 10 described above, and in the square root computation in Formulas 9 and 10, the composite function for the square root computation as shown in FIG. 6 may be used.

For example, when the maximum value calculation for the homomorphic ciphertexts A and B is requested, the computation apparatus 400, referring to FIG. 7, may ① calculate a value of (A+B)/2 and a value of (A−B)/2, ② calculate the square of (A−B)/2 and repeatedly perform the computation of the squared value predetermined number of times d by using a composite function corresponding to the square root computation, and ③ add the result of the composite function to the value of (A+B)/2 calculated previously, thereby calculating a maximum value.

Meanwhile, when the minimum value calculation for the homomorphic ciphertexts A and B is requested, the computation apparatus 400, referring to FIG. 7, may ① calculate a value of (A+B)/2 and a value of (A−B)/2, ② calculate a square of (A−B)/2 and repeatedly perform the computation of the squared value predetermined number of times d by using a composite function corresponding to the square root computation, and ③ subtract the result of the composite function from the value of (A+B)/2 calculated previously, thereby calculating a minimum value.

Meanwhile, hereinabove, it is illustrated and described that the maximum value or the minimum value is output by comparing only two values, but in the implementation, the maximum value calculation and the minimum value calculation may also be performed for three or more homomorphic ciphertexts. For example, when three homomorphic ciphertexts are provided, first and second homomorphic ciphertexts may be compared to each other and then the result thereof and the remaining homomorphic ciphertext may be compared to each other, to calculate a maximum value among the three values or a minimum value among the three values.

FIG. 8 is a diagram illustrating a size comparison method according to a first embodiment.

For example, a comparison function that outputs a value of 0 or 1, when two values are different from each other, and outputs 0.5, when the two values are the same as each other may be approximated as below.

$$comp(a, b) \approx \sigma_k(\log a - \log b) = \frac{e^{k\log a}}{e^{k\log a} + e^{k\log b}} = \frac{a^k}{a^k + b^k} \quad \text{[Formula 14]}$$

Herein, a represents a first homomorphic ciphertext, b represents a second homomorphic ciphertext, and comp(a,b) represents a function that compares two input homomorphic ciphertexts, and outputs 1, when a is large, outputs 0, when b is large, and outputs 0.5, when a is the same as b.

Referring to Formula 14, the approximate function for the comparison function may include the inverse computation. Accordingly, when performing the comparison computation for the homomorphic ciphertexts A and B by using the approximate function such as Formula 14, the computation apparatus 400, referring to FIG. 8, may calculate initial values $a_0$ and $b_0$, and ① perform $Inv(a^m{}_n + b^m{}_n; d)$ computation by using a composite function corresponding to the inverse computation as described in relation to FIG. 5, after the calculating the initial values. In addition, a comparison computation result value may be calculated by repeating ② computation of multiplying the inverse computation value by a value of $a^m{}_n$, and ③ computation of subtracting the value $a_{n+1}$ calculated previously from 1 predetermined number of times t.

FIG. 9 is a diagram illustrating a size comparison method according to a second embodiment.

Meanwhile, the size comparison function may be represented as a sign function as below.

$$comp(a,b) = (sgn(a-b)+1)/2 \quad \text{[Formula 15]}$$

Herein, a represents a first homomorphic ciphertext, b represents a second homomorphic ciphertext, and comp(a,b) represents a function that compares two input homomorphic ciphertexts, and outputs 1, when a is large, outputs 0, when b is large, and outputs 0.5, when a is the same as b. sgn( ) represents a sign function.

Accordingly, the approximation for the size comparison function may be expressed as the approximation for the sign function.

When the sign function satisfies Formula 16 as below, the composite function for the sign function calculation may be represented by Formula 17 as below.

Prop I. $f(-x)=-f(x)$

Prop II. $f(1)=1, f(-1)=-1$

Prop III. $f'(x)=c(1-x^2)^n$ for some constant $c>0$     [Formula 16]

f(x) represents a polynomial function.

$$f_n(x) = \sum_{i=0}^{n} \frac{1}{4^i} \cdot \binom{2i}{i} \cdot x(1-x^2)^i \qquad \text{[Formula 17]}$$

The composite function for the sign function calculation as described above may be a composite function that obtains an output value closer to 1 for an input value larger than 0 and obtains an output value closer to −1 for an input value smaller than 0.

Referring to FIG. 9, when the size comparison computation command for the homomorphic ciphertext is requested, the computation apparatus 400 may perform the comparison computation by performing ① the computation of calculating a difference between two values (a–b), ② repeated computation of the corresponding computation value predetermined number of times d by using Formula 17, and 0 constant computation on the computation value.

Meanwhile, in the method of FIG. 9, a method of the sign function that obtains both ends to be 1 or −1, that is, to be parallel to each other is used. As another characteristic of the ideal sign function, a slop with a value of 0 has an infinity value, in other words, a slop at 0 has a vertical shape. In this regard, hereinafter, the composite function considering this point will be described.

FIG. 10 is a diagram illustrating a method for finding a composite function corresponding to a slope of a sign function.

The approximation of the size comparison function may be expressed as approximation of the sign function as described above.

[Formula 18]

Prop I.  $g(-x) = -g(x)$   (Origin Symmetry)

Prop IV.  $\exists \, 0 < \delta < 1 \text{ s.t. } x < g(x) \leq 1$   (Toward[1 − c.1])

for all $x \in (0.\delta]$.

and $g([\delta.1]) \subseteq [1 - c.1]$   (Keep in [1 − c.1])

Herein, g(x) represents another composite function for sign function calculation, and c represents a range of convergence of an output value which may be defined as a value smaller than 1 such as ¼, ⅓, or the like.

When the sign function satisfies Formula 18, the computation apparatus 400 may calculate a function for g(x) by using the method shown in FIG. 10.

When the composite function is calculated by the method shown in FIG. 10, the size comparison method may also be performed by using a combination with the composite function described with reference to FIG. 9. This will be described below with reference to FIG. 11.

FIG. 11 is a diagram illustrating a size comparison method according to a third embodiment.

Referring to FIG. 11, when the size comparison computation command for the homomorphic ciphertext is requested, the computation apparatus 400 may perform the comparison computation by performing ① computation of calculating a difference between two values (a–b), ② repeated computation of the corresponding computation value on a composite function $g_n(x)$ calculated by the method of FIG. 10 predetermined number of times $d_g$, ③ repeated computation of the corresponding computation value predetermined number of times $d_f$ by using Formula 17 ($f_n(x)$), and ④ constant computation on the computation value.

Figure 12:
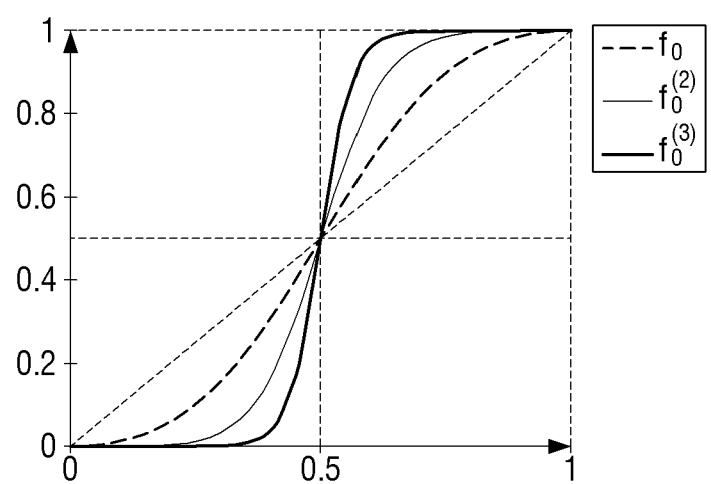
FIG. 12 is a diagram illustrating a shape of a composite function corresponding to a sign function for each repeated number of times.
Figure 13:
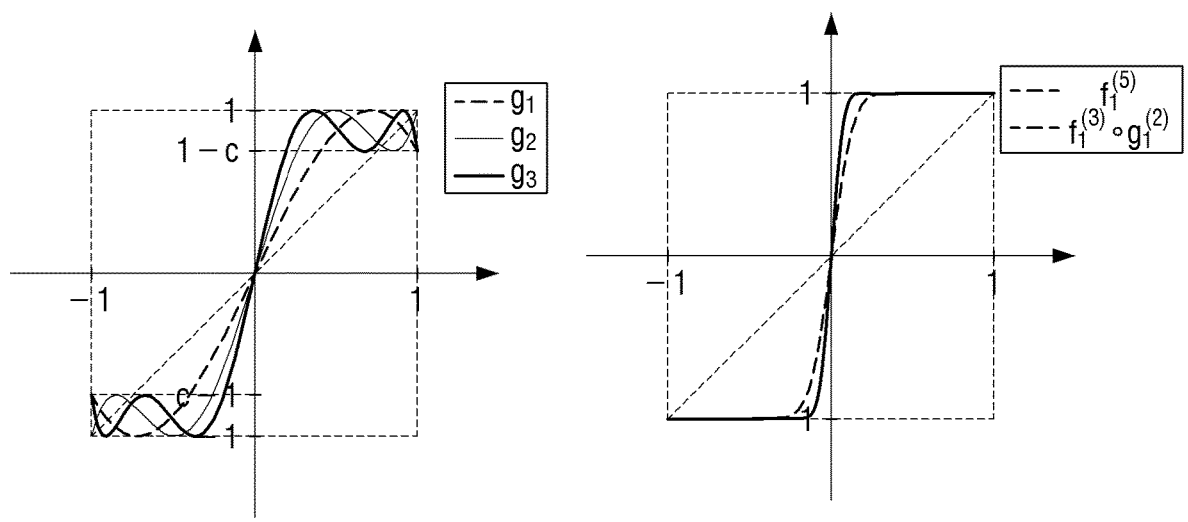
FIG. 13 is a diagram illustrating shapes of various composite functions related to the sign function for each repeated number of times.

FIG. 12 is a diagram illustrating a shape of a composite function corresponding to a sign function for each repeated number of times, and FIG. 13 is a diagram illustrating shapes of various composite functions related to the sign function for each repeated number of times.

Referring to FIG. 12, it may be confirmed that the composite function $f_n(x)$ described with reference to FIG. 9 has a more ideal shape, as the repeated number of times increases.

Referring to the left drawing of FIG. 13, it may be confirmed that the composite function described with reference to FIG. 10 has a higher slope than that of the composite function of FIG. 9 but an error occurs at both ends. Accordingly, when the composite function of FIG. 10 is used at the initial stage and the composite function of FIG. 9 is used at the later stage, in other words, when the composite function combined by using the method as in FIG. 11 is used, an ideal shape may be obtained compared to a case of using only the composite function of FIG. 9 or the comparison with the same repeated number of times.

Specifically, referring to the right drawing of FIG. 13, it may be confirmed that, when the composite function of FIG. 10 is applied twice and the composite function of FIG. 9 is applied three times, the ideal shape is obtained, compared to a case where the composite function of FIG. 9 is applied five times.

Meanwhile, the ciphertext processing method according to the various embodiments may be implemented in a form of a program code for performing each process and may be stored in a recording medium and distributed. In this case, an apparatus mounted with the recording medium may perform operations such as encryption or ciphertext processing described above.

The recording medium may be various types of computer-readable medium such as a ROM, a RAM, a memory chip, a memory card, an external hard disk, a hard disk, a CD, a DVD, a magnetic disk, or a magnetic tape.

Although the description of the disclosure is made with reference to the accompanying drawings, the scope of the rights is defined by the appended claims and is not construed as being limited to the described embodiments and/or the drawings. In addition, it should be clearly understood that various improvements, modifications, and changes of the embodiments of the claims which are obvious to those skilled in the art are included in the scope of rights of the disclosure.

INDUSTRIAL APPLICABILITY

What is claimed is:

1. A ciphertext computation method comprising:
receiving an input of a comparison computation command for a plurality of homomorphic ciphertexts;
performing computation by reflecting the plurality of homomorphic ciphertexts to a composite function corresponding to the comparison computation command; and
outputting the computed homomorphic ciphertext,
wherein the comparison computation is maximum value calculation or minimum value calculation, and
wherein the performing the computation comprises performing computation of the maximum value calculation or the minimum value calculation by using a composite function corresponding to square root computation.

2. The ciphertext computation method according to claim 1, wherein the composite function has a complexity $\theta(\alpha)$ or $\theta(\alpha \log \alpha)$ in response to an accuracy $2^{-\alpha}$.

3. The ciphertext computation method according to claim 1, wherein the composite function corresponding to the square root computation is a function that repeatedly performs computation of a first function including a first variable having an input value as an initial value and a second variable having a value obtained by subtracting 1 from the input value as an initial value, and a second function including the second variable predetermined number of times.

4. The ciphertext computation method according to claim 3, wherein the predetermined number of times is a number of times corresponding to an error rate of the square root computation.

5. A ciphertext computation method comprising:
receiving an input of a comparison computation command for a plurality of homomorphic ciphertexts;
performing computation by reflecting the plurality of homomorphic ciphertexts to a composite function corresponding to the comparison computation command; and
outputting the computed homomorphic ciphertext,
wherein the comparison computation is computation of outputting a predetermined value according to size comparison, and
wherein the performing the computation comprises repeatedly performing computation by using a composite function corresponding to a sign function predetermined number of times.

6. The ciphertext computation method according to claim 5, wherein the composite function corresponding to the sign function is a composite function that obtains an output value closer to 1 for an input value larger than 0 and obtains an output value closer to −1 for an input value smaller than 0.

7. The ciphertext computation method according to claim 5, wherein the performing the computation comprises performing the comparison computation by using two or more different composite functions which are approximate functions corresponding to the sign function.

8. A computation apparatus comprising:
a memory storing at least one instruction; and
a processor configured to execute the at least one instruction,
wherein the processor, by executing the at least one instruction, is configured to,
based on an input of a comparison computation command for a plurality of homomorphic ciphertexts being received, perform computation by reflecting the plurality of homomorphic ciphertexts to a composite function corresponding to the comparison computation command, and output the computed homomorphic ciphertext,
wherein the comparison computation is maximum value calculation or minimum value calculation, and
wherein the performing the computation comprises performing computation of the maximum value calculation or the minimum value calculation by using a composite function corresponding to square root computation.

9. A computation apparatus comprising:
a memory storing at least one instruction; and
a processor configured to execute the at least one instruction,
wherein the processor, by executing the at least one instruction, is configured to,
based on an input of a comparison computation command for a plurality of homomorphic ciphertexts being received, perform computation by reflecting the plurality of homomorphic ciphertexts to a composite function corresponding to the comparison computation command, and output the computed homomorphic ciphertext,
wherein the comparison computation is computation of outputting a predetermined value according to size comparison, and
wherein the processor is configured to repeatedly perform computation by using a composite function corresponding to a sign function predetermined number of times.

10. The computation apparatus according to claim 9, wherein the composite function corresponding to the sign function is a composite function that obtains an output value closer to 1 for an input value larger than 0 and obtains an output value closer to −1 for an input value smaller than 0.

11. The computation apparatus according to claim 9, wherein the processor is configured to perform the comparison computation by using two or more different composite functions which are approximate functions corresponding to the sign function.

* * * * *